(No Model.)
T. A. EDISON.
SECONDARY BATTERY.
No. 273,492. Patented Mar. 6, 1883.
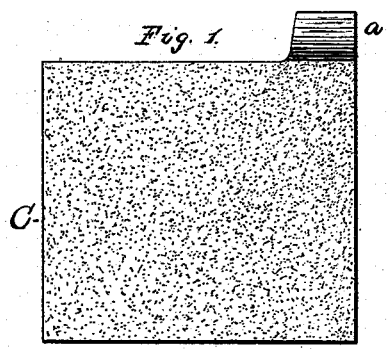
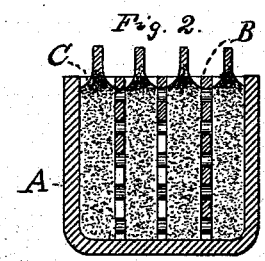
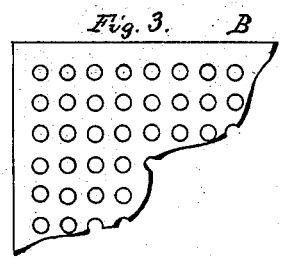
WITNESSES:
E. C. Rowland,
G. P. Mott
INVENTOR:
Thomas A. Edison
BY
ATTORNEY

UNITED STATES PATENT OFFICE.

THOMAS A. EDISON, OF MENLO PARK, NEW JERSEY.

SECONDARY BATTERY.

SPECIFICATION forming part of Letters Patent No. 273,492, dated March 6, 1883.

Application filed June 26, 1882. (No model.)

*To all whom it may concern:*

Be it known that I, THOMAS A. EDISON, of Menlo Park, in the county of Middlesex and State of New Jersey, have invented a new and useful Improvement in Secondary Batteries, (Case No. 419;) and I do hereby declare that the following is a full and exact description of the same, reference being had to the accompanying drawings, and to the letters of reference marked thereon.

The object I have in view is to produce a highly efficient form of secondary battery, employing electrodes of metallic lead of such peculiar construction that the battery will be ready for use with a far less extensive preparatory "forming" of the electrodes than is required with ordinary lead plates. This I accomplish by the employment of electrodes made entirely of finely-divided or spongy metallic lead, which is produced chemically or by electrolysis, portions of such electrodes being compressed to form connections.

In carrying out the invention the finely-divided metallic lead is packed in vertical compartments in a suitable vessel. These compartments are separated by perforated partitions, which are constructed of suitable insulating material—such as celluloid, hard rubber, cloth, mica, earthenware, or parchment paper. The finely-divided metallic lead is extended above the perforated insulating partitions at one end of each electrode, and is compressed into a solid mass for giving means for making the necessary connections. The dilute sulphuric acid is held by the perforations of the partitions and by the pores of the material of which the partitions are constructed, if a porous material is employed, and by perforating the material closely a large part of the surface of each electrode will be exposed to the action of the oxygen and hydrogen liberated in charging the battery. The spongy or finely-divided metallic lead may be obtained by any method, as by heating an organic salt of lead, or by precipitating finely-divided lead by immersing metallic iron or zinc in a solution containing a lead salt—such as the acetate of lead, or by depositing finely-divided metallic lead by the electrolysis of the acetate of lead, the deposited lead being removed and packed into the compartments as before explained.

In the accompanying drawings, forming a part hereof, Figure 1 is an elevation of one of the electrodes; Fig. 2, a vertical section of a battery constructed in accordance with my invention; and Fig. 3 a view of a portion of one of the perforated partitions.

A is a suitable vessel, which is divided into compartments by transverse partitions B. These partitions are made of a suitable insulating material, and are perforated as shown. The electrodes C are made of finely-divided metallic lead, packed into the compartments, as shown. The finely-divided metallic lead of each electrode is extended up at one end and is compressed to form the solid lug $a$ to which connection is made. The electrodes of finely-divided metallic lead are retained in position and separated by the insulating partitions, in the perforations of which is held the dilute sulphuric acid.

What I claim is—

The electrodes for secondary batteries composed of finely-divided metallic lead having compressed portions for connections, substantially as set forth.

This specification signed and witnessed this 19th day of May, 1882.

THOMAS A. EDISON.

Witnesses:
   EDW. C. ROWLAND,
   C. P. MOTT.